(12) United States Patent
Iqbal et al.

(10) Patent No.: US 11,461,091 B2
(45) Date of Patent: Oct. 4, 2022

(54) SYSTEM AND METHOD FOR CREATING OR UPDATING TENANT ARTIFACTS BY A MULTI-TENANT CLOUD SERVICE

(71) Applicant: ORACLE INTERNATIONAL CORPORATION, Redwood Shores, CA (US)

(72) Inventors: Arif Iqbal, San Carlos, CA (US); Lokesh Madan, Santa Clara, CA (US); Ralf Mueller, Mannheim (DE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 11 days.

(21) Appl. No.: 17/167,043

(22) Filed: Feb. 3, 2021

(65) Prior Publication Data

US 2022/0244949 A1    Aug. 4, 2022

(51) Int. Cl.
  *G06F 8/71*   (2018.01)
  *G06F 8/65*   (2018.01)
  *G06F 9/54*   (2006.01)
  *G06F 9/50*   (2006.01)

(52) U.S. Cl.
  CPC .......... *G06F 8/71* (2013.01); *G06F 8/65* (2013.01); *G06F 9/5072* (2013.01); *G06F 9/547* (2013.01)

(58) Field of Classification Search
  None
  See application file for complete search history.

(56) References Cited

U.S. PATENT DOCUMENTS

| | | | |
|---|---|---|---|
| 10,454,788 B2 | 10/2019 | Mordani | |
| 10,467,070 B2 | 11/2019 | Iqbal | |
| 11,030,164 B2* | 6/2021 | Eberlein | G06F 16/252 |
| 11,042,425 B2 | 6/2021 | Iqbal | |
| 11,050,753 B2 | 6/2021 | Iqbal | |
| 11,374,833 B2 | 6/2022 | Mordani | |
| 2018/0039494 A1* | 2/2018 | Lander | G06F 8/656 |
| 2018/0074873 A1 | 3/2018 | Iqbal | |
| 2018/0083967 A1* | 3/2018 | Subramanian | H04L 41/5041 |
| 2019/0052550 A1 | 2/2019 | Mordani | |
| 2019/0104129 A1 | 4/2019 | Iqbal | |
| 2020/0050525 A1 | 2/2020 | Iqbal | |
| 2020/0412596 A1* | 12/2020 | Cherunni | H04L 41/02 |
| 2021/0064417 A1* | 3/2021 | Jiang | H04L 63/0807 |
| 2021/0218622 A1* | 7/2021 | Kulkarni | H04L 41/5054 |
| 2021/0273946 A1 | 9/2021 | Iqbal | |
| 2021/0326194 A1 | 10/2021 | Iqbal | |

* cited by examiner

*Primary Examiner* — Marina Lee
(74) *Attorney, Agent, or Firm* — Tucker Ellis LLP (57) ABSTRACT

In accordance with an embodiment, described herein is a system and method for use with a cloud computing environment, for creating or updating tenant artifacts using microservices. A multi-tenant cloud service provides a loosely-coupled and distributed approach for consistently creating or updating tenant artifacts through the use of multiple independent microservice's lifecycle containers, each having their own requirements during the creation or update of a tenant instance. The development and packaging of lifecycle containers is simplified by managing the software code responsible for artifact creation or update within a microservice code repository. The system can use a deployment approach of loosely-coupled microservice lifecycle containers together with an infrastructure lifecycle service that coordinates tenant artifact creation/update across multiple microservices.

15 Claims, 8 Drawing Sheets

SYSTEM AND METHOD FOR CREATING OR UPDATING TENANT ARTIFACTS BY A MULTI-TENANT CLOUD SERVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing environments, cloud services, and microservices, and are particularly directed to systems and methods for use with multi-tenant cloud computing environments for creating or updating tenant artifacts using microservices.

BACKGROUND

Microservice computing architectures have become popular for developing software applications to be provided in cloud computing environments as cloud services. However, in a typical multi-tenant cloud service cluster, the creation or updating of tenant artifacts associated with a cloud service can be a complex process, particularly when there is a need to support multiple versions of the cloud service, which may result in incompatibilities between the different versions.

SUMMARY

In accordance with an embodiment, described herein is a system and method for use with a cloud computing environment, for creating or updating tenant artifacts using microservices. A multi-tenant cloud service provides a loosely-coupled and distributed approach for consistently creating or updating tenant artifacts through the use of multiple independent microservice's lifecycle containers, each having their own requirements during the creation or update of a tenant instance. The development and packaging of lifecycle containers is simplified by managing the software code responsible for artifact creation or update within a microservice code repository. The system can use a deployment approach of loosely-coupled microservice lifecycle containers together with an infrastructure lifecycle service that coordinates tenant artifact creation/update across multiple microservices.

DETAILED DESCRIPTION

In accordance with an embodiment, described herein is a system and method for use with a cloud computing environment, for creating or updating tenant artifacts using microservices. A multi-tenant cloud service provides a loosely-coupled and distributed approach for consistently creating or updating tenant artifacts through the use of multiple independent microservice's lifecycle containers, each having their own requirements during the creation or update of a tenant instance. The development and packaging of lifecycle containers is simplified by managing the software code responsible for artifact creation or update within a microservice code repository. The system can use a deployment approach of loosely-coupled microservice lifecycle containers together with an infrastructure lifecycle service that coordinates tenant artifact creation/update across multiple microservices.

In accordance with an embodiment, the described approach can be adapted for use with various types of cloud computing or cloud service environments, and/or with various types of microservice environments such as, for example, Spring Boot, Helidon, Micronaut, or Quarkus.

In a cloud computing environment at which customers/tenants access cloud services, from time to time it may be desired to update a particular cloud service, for example to provide a new feature or support for various artifacts. However, a multi-tenant cloud service environment can have multiple tenants, which necessitates updating each tenant appropriately.

In accordance with an embodiment, a cloud service can have multiple tenants. Examples of such cloud services can include Oracle Digital Assistant (ODA), an example of which is illustrated below and which provides a cloud service platform that enables cloud tenants to create and deploy digital assistants for their users, such as Al-driven interfaces that help the users accomplish tasks in natural language conversations. In accordance with various embodiments, other types of cloud services can be supported.

In such environments, each of the tenants may be associated with artifacts that are generally defined by the cloud service, but may be specifically adapted for use with a particular tenant. For example, a cloud service may require a database schema, or particular database tables or column, or other database artifacts for use with tenants.

When a cloud service is updated, the system must take into account updating the artifacts associated with each of the tenants of that cloud service. For example, a new version of a cloud service may add new artifacts, such as new database tables, or new columns to an existing table, and such updates to the service must be reflected in the artifacts for each tenant.

Such tenant artifact creation/update is typically performed by one of two approaches: either a control plane approach, or a functional microservices approach, both of which approaches are generally described below.

Control Plane Approach

With a control plane approach, tenant artifact creation/update is managed completely by a service control plane, which provides an internal API accessible to the cloud provider, which allows lifecycle management of the cloud service and its tenant instances. For example, if the system adds a new database table to a service, then the control plane can take control of adding that database table to each service instance schema.

While this approach provides advantages in terms of tight management and monitoring of service instance on-boarding/updates, the approach also has various issues, for example:

Typically, the service control plane code and associated functional microservices code are located in different code repositories, which means that service instance on-boarding and update is not managed by individual functional microservices. Although the code logically is part of a functional microservice, it may be scattered to another control plane, which risks the service control plane code being incompatible with a given version of microservice deployed to production. Compatibility between different versions of functional microservices and control plane code must be tracked and managed, which is often a manual operation and requires careful human review; since any error can potentially cause production outage.

Another complexity resulting from this approach is that when a validated control plane code has been forked for a release from a master version, it is difficult to make changes in functional microservices dependent on a new service instance on-boarding/update change, even if the functional microservice code is not yet forked for a release.

Considering the example of a schema artifact as described above—updates to the schema artifact, which should be within the purview of the microservice itself, actually falls within the responsibility of the control plane—which hinders the microservice-like aspects of the environment and violates the microservices isolation design pattern. The software developer would need to first go to the control plane code repository, and make an appropriate change there, and then go to the microservice code repository and make the corresponding changes, and then roll out the changes.

Functional Microservice Approach

With a functional microservice approach, a tenant artifact (e.g., a database schema, or object storage) creation/update is performed by a functional microservice, generally upon the first tenant request received for the service instance after service instance on-boarding or functional microservice container update. The functional microservice has the necessary capability of determining if and when an update or creation of artifacts is needed.

While this approach provides an advantage of functional microservice completely managing the service instance artifacts, and ensures that functional microservice code will not be incompatible with the artifacts, it has the following issues:

As all artifact creation is performed at the time of first tenant request (after service instance on-boarding or microservice container update), the approach adds latency to the first requests. Any failure during artifact creation/update due to environmental issues can momentarily fail tenant requests. In worst cases, for example database corruption, the artifact creation/update might error out continuously and cause outage to the tenant (and hence violate zero down time SLAs).

Additionally, as instances are updated only when a request is made by tenant, various services instances across an organization fleet could be on different artifact versions. This can add complexity for a development/operations (DevOps) team responsible for fleet monitoring and management. Since service instance update only happens on demand, different tenants may perform different updates separately, so an inactive tenants may not get the update.

For example, considering again the case of database table update as described above—those tenants may have different schema versions. This is not so much a problem between different organizations; however between different fleets within an organization it can be a problem, Also the update is performed as part of the request to the service—so in a cloud service it might be attempted when initiating a business process—during a live request at the data plane, wherein a failure to the services instance update fails can result in problems during the live request.

Distributed Approach for Consistent Upgrade

In accordance with an embodiment, described herein is a system and method for use with a cloud computing environment, for creating or updating tenant artifacts using microservices. A multi-tenant cloud service provides a loosely-coupled and distributed approach for consistently creating or updating tenant artifacts through the use of multiple independent lifecycle containers, each taking full ownership of their own requirements during the creation/update of a tenant's cloud service instance. The development and packaging of lifecycle containers is simplified by managing the software code responsible for artifact creation/update within a microservice code repository.

In accordance with an embodiment, the microservice code repository generates two containers, i.e., a lifecycle container, and a functional container. The lifecycle container is responsible for managing tenant artifacts. The functional container is responsible for serving business requests for tenants. The system can use a deployment approach of loosely-coupled microservice lifecycle containers together with an infrastructure lifecycle service that coordinates tenant artifact creation/update across multiple microservices.

In accordance with an embodiment, the approach can be used to address various considerations, such as for example:

(A) Tenant on-boarding or update-time artifact operations (e.g., in database schema, or object storage) should be owned and managed by the microservice. This helps to ensure that a given microservice functional container code is always compatible with the schema and other artifacts, and also smooths the change delivery aspects from a DevOps perspective.

(B) Front-load tenant artifacts (e.g., in database schema, object storage) creation/update and avoid performing it upon first tenant request on service instance. This helps to avoid latency issues for the tenant, helps to have a higher degree of control on schema update, and provides a deterministic way to know failures during schema updates.

(C) A schema or other artifact update failure should not affect existing live tenant business requests; nor should a schema or other artifact update make any incompatible change (e.g., by dropping tables) which can cause existing microservice functional containers to fail.

(D) Tenant update should be resilient to failures and should be retryable. Tenant update changes must be idempotent to allow for recovery from partial update failures.

(E) Zero down time for tenants during updates. Live requests should have no or negligible impact during updates.

The above considerations are provided by way of example. In accordance with various embodiments, other features and advantages can also be supported.

Figure 1:
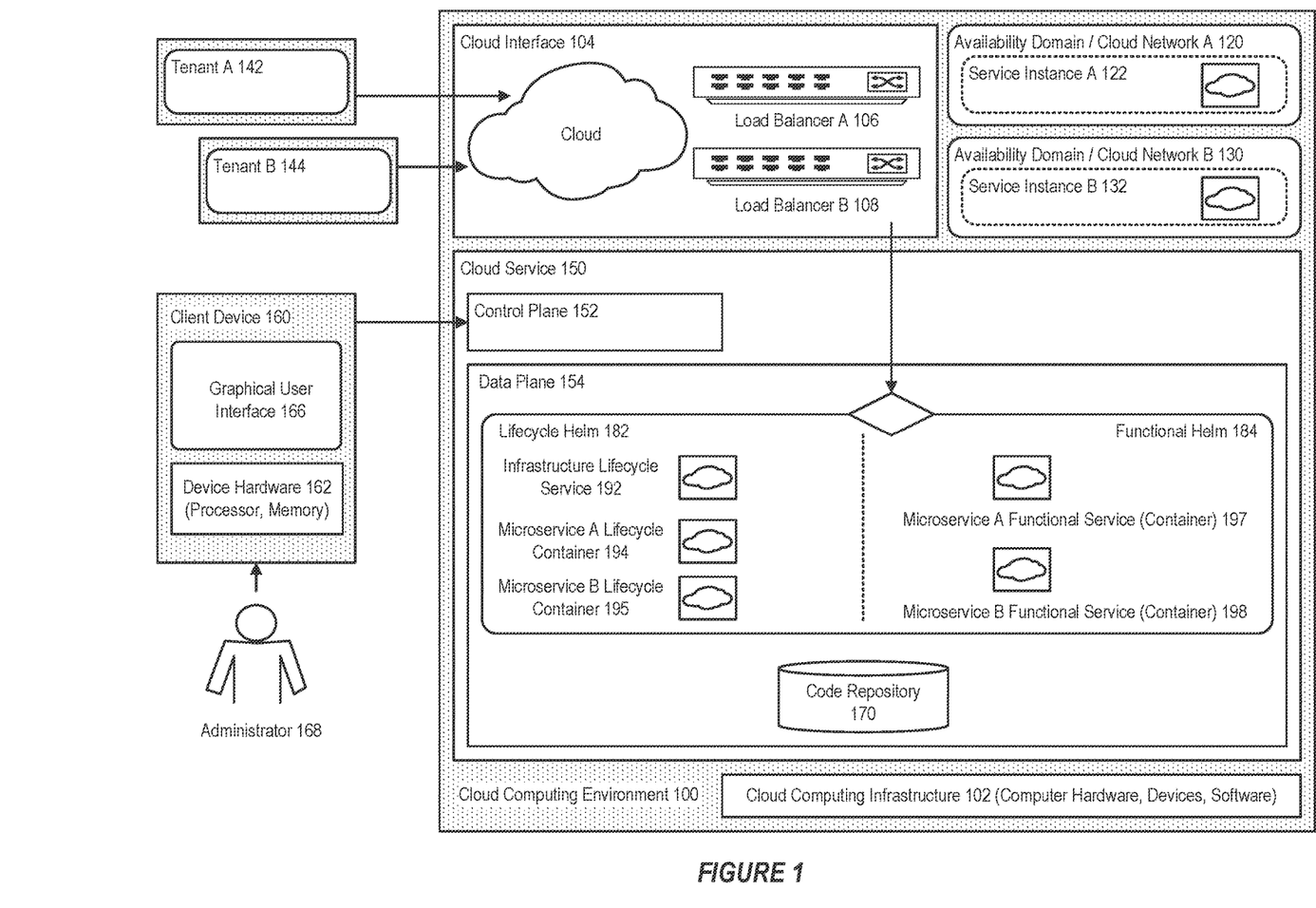
FIG. 1 illustrates a system for creating or updating tenant artifacts by a multi-tenant cloud service, in accordance with an embodiment.

FIG. 1 illustrates a system for creating or updating tenant artifacts by a multi-tenant cloud service, in accordance with an embodiment.

As generally described herein, the described approach includes the use of microservice lightweight lifecycle containers that expose a well-defined lifecycle API (for example, via gRPC) and that are responsible for individual microservice lifecycle operations, for example to create/update artifacts in a database schema or storage service.

During a lifecycle operation, an infrastructure lifecycle service can invoke these individual microservices' lifecycle containers, for example via gRPC.

Although the infrastructure lifecycle service operates as an external facilitator for front loading artifact creation/updates, the tenant artifacts itself continues to be owned and managed by the microservices. At runtime, each functional container will ensure that tenant artifacts are compatible with its binaries. Since artifact changes are already performed by lifecycle containers, this check will always be successful and hence the functional container will not, e.g., fail, or trigger its own schema update individually.

A technical advantage of the described approach includes that it conforms to general microservice design principles, wherein a microservice should be able to own or control changes to its tenant artifacts, for example changes to associated database schemas, while also addressing each of the above-described considerations.

As illustrated in FIG. 1, in accordance with an embodiment, a cloud computing environment 100 can operate on a cloud computing infrastructure 102 comprising hardware (e.g., processor, memory), and software resources, and further comprising, for example, one or more cloud interfaces 104 or other application program interfaces (API) that provide access to the shared cloud infrastructure resources via one or more load balancers A 106, B 108.

In accordance with an embodiment, the components and processes illustrated in FIG. 1, and as further described herein with regard to various embodiments, can be provided as software or program code executable by a computer system or other type of processing device. For example, in accordance with an embodiment, the components and processes described herein can be provided by a cloud computing system, or other suitably-programmed computer system.

In accordance with an embodiment, the load balancers can provide automated traffic distribution from an entry point to multiple servers reachable from an availability domain or cloud network A 120, B 130, and can improve resource utilization, scaling, and help ensure high availability.

In accordance with an embodiment, each cloud network can comprise subnets, route tables, and gateways, on which tenant instances, e.g., service instance A 122, B 132 can run.

Generally, a cloud network resides within a single region, and includes the region's availability domains. Each subnet defined in the cloud network can either be in a single availability domain, or span availability domains in the region. A tenancy can be created for each tenant or tenant A 142, B 144, which provides a secure isolated partition within the cloud infrastructure environment, within which the tenant can access their cloud resources.

In accordance with an embodiment, each cloud service 150 can be associated with a control plane 152, and data plane 154, which are used to provide the tenant instances.

In accordance with an embodiment, a client device, such as, for example, a computing device 160 having a device hardware 162 (e.g., processor, memory), and graphical user interface 166, can enable an administrator 168 or other user to communicate with the cloud computing environment via a network such as, for example, a wide area network, local area network, or the Internet, to create or update cloud services.

In accordance with an embodiment, a code repository 170 provides microservice code which provide the cloud service and artifacts associated therewith.

In accordance with an embodiment, when a software deployment or management technology such as Kubernetes/Helm is used, the data plane can include a lifecycle helm 182 and a functional helm 184.

Within the lifecycle helm, infrastructure lifecycle service 192 is adapted to invoke on individual microservices lifecycle containers A 194, B 195; and take care of deploying infrastructure lifecycle service and individual microservice's lifecycle container to the data plane. Within the functional helm, one or more functional service components A 197, B 198 take care of deploying a microservice's functional container to the data plane.

Figure 2:
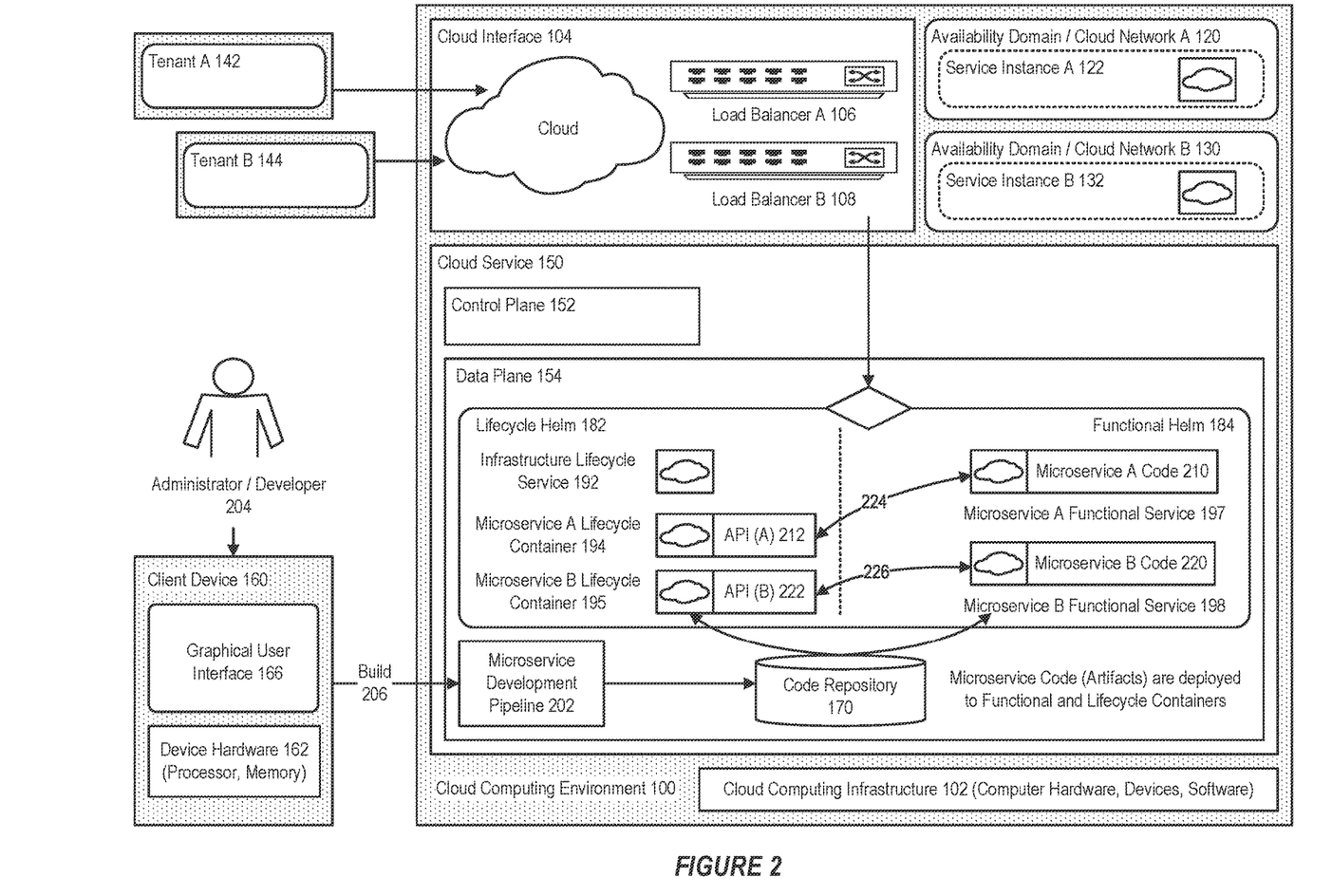
FIG. 2 further illustrates a system for creating or updating tenant artifacts by a multi-tenant cloud service, in accordance with an embodiment.

FIG. 2 further illustrates a system for creating or updating tenant artifacts by a multi-tenant cloud service, in accordance with an embodiment.

As illustrated in FIG. 2, the system can include a microservice development pipeline 202 that enables an administrator or software developer 204 to build 206 a cloud service.

In accordance with an embodiment, each of the microservices that are intended to support tenant artifact creation or update must provide a lightweight lifecycle container; wherein the lifecycle container provides an API (A) 212, (B) 222 that allows for the creation of upgrade of a service instance that uses that microservice.

In accordance with an embodiment, the infrastructure lifecycle service then provides access to the APIs associated with each lifecycle container. As illustrated in the figure, each of the above components can be provide as part of the data plane associated with the cloud service.

Since both the microservice functional container code, A 210, B 220, and the lifecycle container code are shipped from the same code repository—this means the software developer has a single location from where they can control, create, or update, the software code for the service—or for an artifact for that service, such as, for example, a new table or a new column to an existing table.

In accordance with an embodiment, when the software developer implements a service instance update, for example to add a new table or modify a column to an existing table, the system can configure a contract 224, 226 or otherwise wire that new/updated code in the service module to the lifecycle API implemented and associated with the container for that service.

The microservice is then shipped as two containers—one container for the functional microservice, and the other container that operates as the lifecycle container and provides that API. Thereafter, the functional microservice API operates to serve tenant requests; while the lifecycle container API operates to handle updates to the tenant artifacts.

In accordance with an embodiment, when a software development framework such as Spring Boot is used, which provides the ability to define multiple profiles—the same container can run in two different profiles and serve two purposes/roles—one as the functional container, and the other as a lifecycle container. The use of profiles avoids having to make two containers —instead the software developer can package one container for the microservice that supports two profiles. When the system brings the container up as a lifecycle, the container can support the lifecycle profile, and when the system brings the container up as a functional service, the container can support the function profile.

In this manner, when the microservice software code repository is used to build or update a microservice, it produces the two containers, which are completely compatible with one another since they are generated from the same underlying source code.

Figure 3:
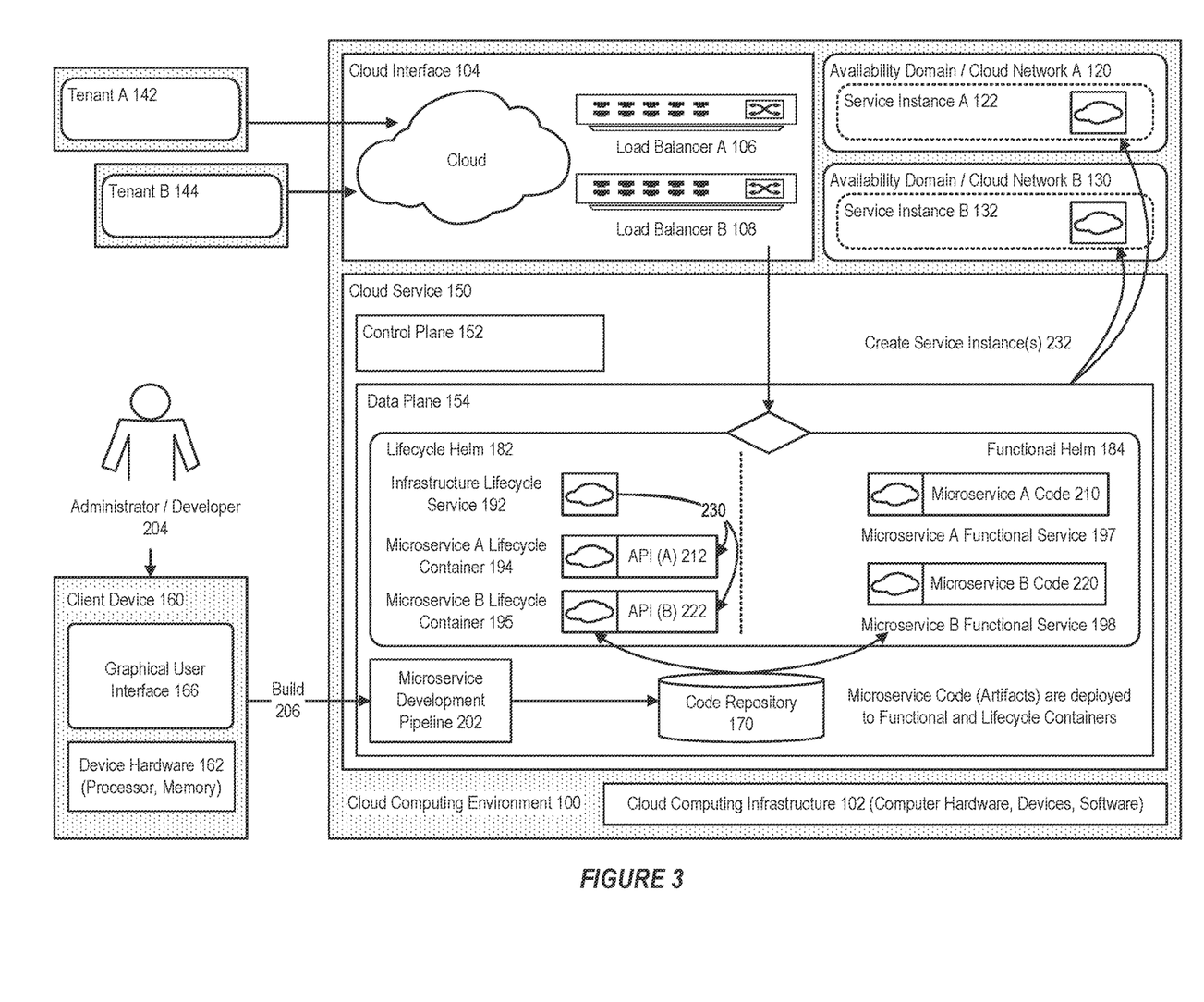
FIG. 3 further illustrates a system for creating or updating tenant artifacts by a multi-tenant cloud service, in accordance with an embodiment.

FIG. 3 further illustrates a system for creating or updating tenant artifacts by a multi-tenant cloud service, in accordance with an embodiment.

As illustrated in FIG. 3, the infrastructure lifecycle service can operate independently once it knows which lifecycle containers to be aware of, and which container to invoke 230 when it needs to create (or update) 232 a particular service instance. A contract operates between both sides as a result of being produced by the same contract source code, e.g. gRPC protobuf or Swagger REST contract.

In accordance with an embodiment, when a software deployment or management technology such as Kubernetes/ Helm is used, one helm deployment script can be responsible for updating the lifecycle portion of the microservices, and another helm deployment script responsible for update the functional containers. The deployment scripts need to be aware of which version of the containers to be deployed into the production cluster. This can be easily achieved by a one-time operation of forking a release branch out of each microservice code repository; and then using the functional and lifecycle containers generated by the release branch.

In accordance with an embodiment, the system can use a continuous integration/continuous delivery (CI/CD) pipeline that determines if there is any change to a microservice that is present in the software code repository, and the pipeline then pushes the information to functional and lifecycle helm. For example, the CI/CD build pipeline can generate new Docker containers from the latest microservice code repository, and then update the microservice's container version in the functional and lifecycle helm.

Figure 4:
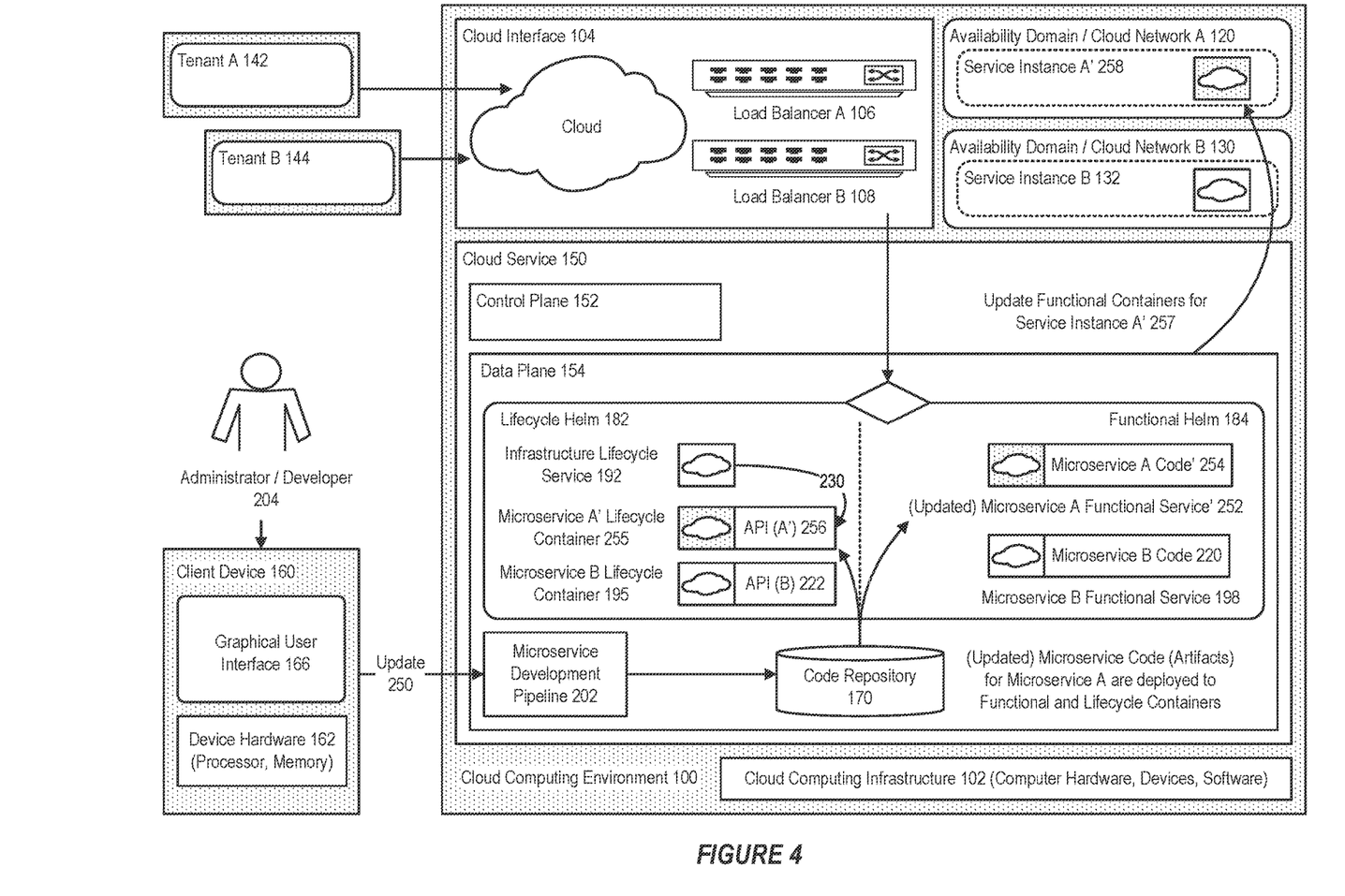
FIG. 4 further illustrates a system for creating or updating tenant artifacts by a multi-tenant cloud service, in accordance with an embodiment.

FIG. 4 further illustrates a system for creating or updating tenant artifacts by a multi-tenant cloud service, in accordance with an embodiment.

The above described approach generally takes care of the deployment aspects for a new cloud service, which in accordance with an embodiment involves the control plane handling the creation of the new service in combination with the data plane.

As illustrated in FIG. 4, in accordance with an embodiment, during update 250, the modified cloud service artifacts are provided as changed code in the software code repository functional and lifecycle containers associated with the (modified/updated) microservice, for example an updated microservice A 252 can include an updated code A' 254 and API (a') 256.

In accordance with an embodiment, the system can use a two-phase approach; first by deploying the deployment script to update the lifecycle containers, so that all lifecycle containers are updated but the functional service are still on the old versions. Then, once the new versions of the lifecycle containers are up, the infrastructure lifecycle service can invoke on the lifecycle containers (which have been updated so they have the new code, e.g., a new table, or new column on table), and calls the lifecycle containers for each tenant, to update the artifacts on those tenants. Such process does not require the involvement of the control plane.

Subsequently, a DevOps team can run the functional deployment scripts to update 257 the functional containers A' 258. Since all of the tenant artifacts have already been updated to the new definition, there is no risk in updating the functional containers.

Figure 5:
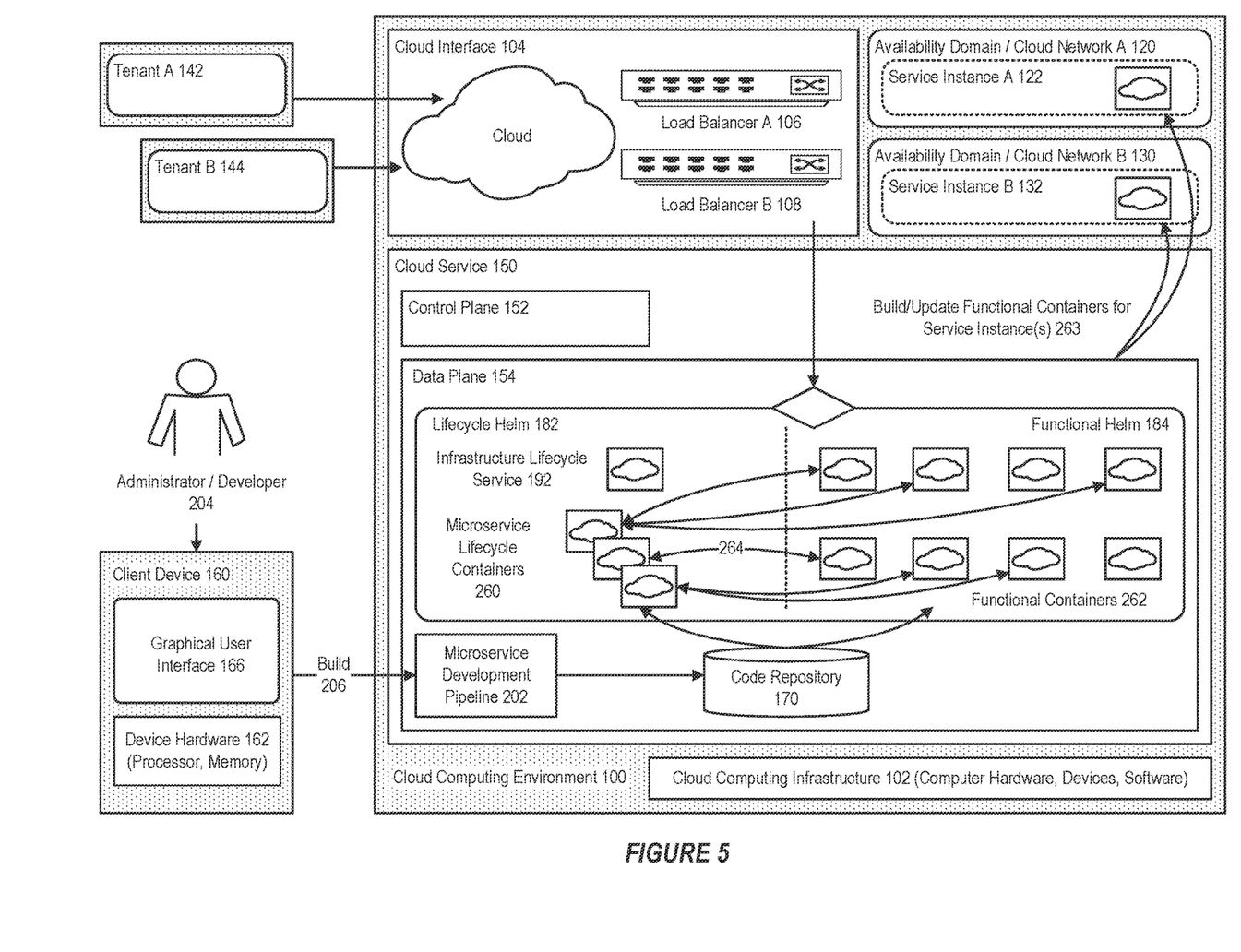
FIG. 5 further illustrates a system for creating or updating tenant artifacts by a multi-tenant cloud service, in accordance with an embodiment.

FIG. 5 further illustrates a system for creating or updating tenant artifacts by a multi-tenant cloud service, in accordance with an embodiment.

As illustrated in FIG. 5, in an accordance with an embodiment, each of a plurality microservice lifecycle containers 260 can be associated with a plurality of functional containers 262, built or updated 263 using the above approach and including contracts or appropriately wired 264.

In accordance with an embodiment, the system provides a means of error catching such that tenant requests continue to function. Since the existing versions continue to run in the cluster, the tenant has no downtime.

Figure 6:
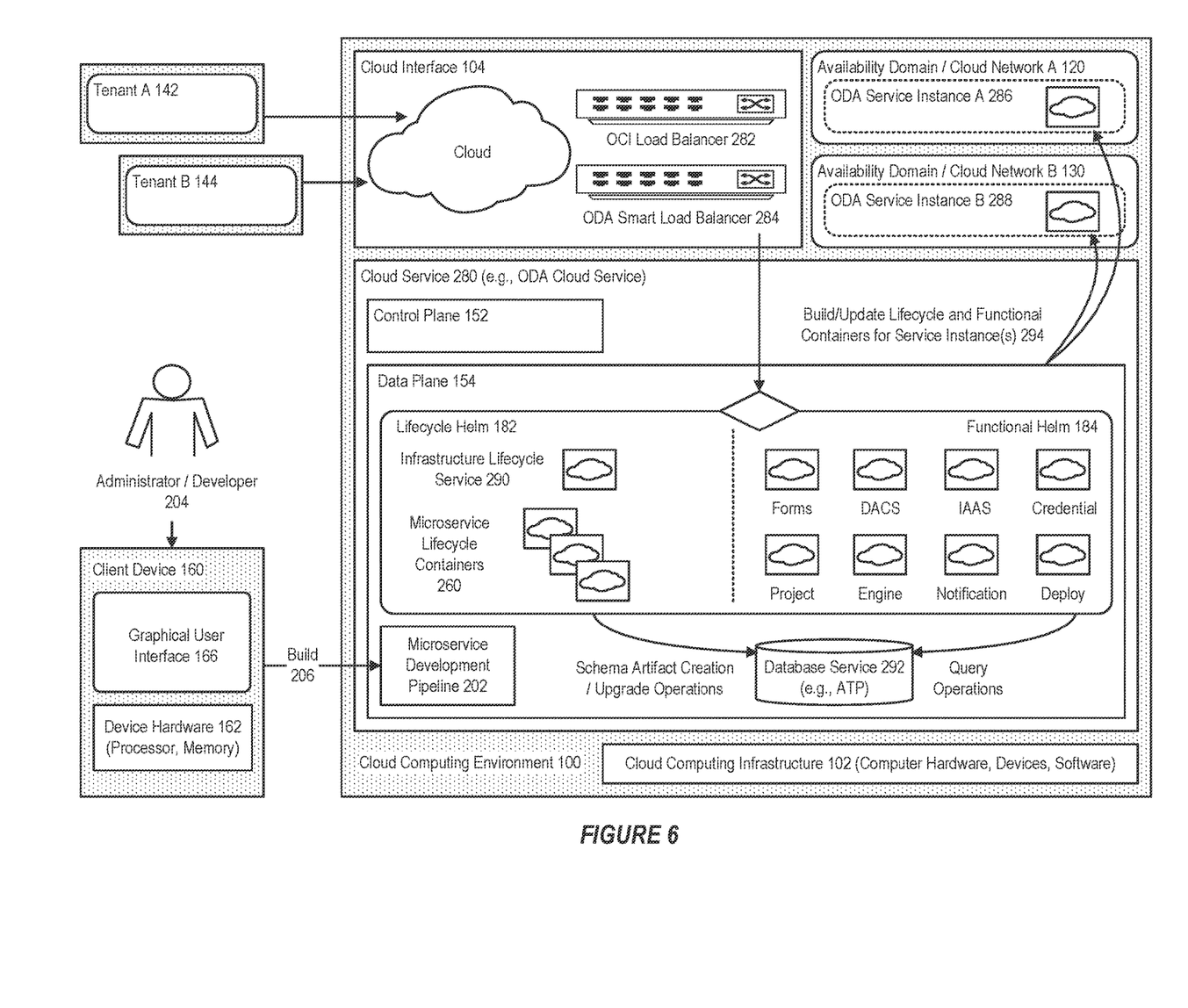
FIG. 6 illustrates an example creating or updating tenant artifacts by a multi-tenant cloud service, in accordance with an embodiment.

FIG. 6 illustrates an example creating or updating tenant artifacts by a multi-tenant cloud service, for use with an Oracle Digital Assistant (ODA) cloud service environment, in accordance with an embodiment.

As illustrated in FIG. 6, which is provided for purposes of illustrating a use of the approach described herein, in accordance with an embodiment, the system can include a cloud service 280 (e.g., ODA cloud service that provide ODA functionality. Tenants can access the cloud computing environment via an OCI load balancer 282 and ODA smart load balancer 284, to access ODA service instance A 286 B 288. The cloud service can include an infrastructure lifecycle service 290 and database service 292 and a variety of microservices, for example Forms, DACS, IAAS, Credential, Project, Engine, Notification, or Deploy microservices, that provide the cloud service. The cloud service's functional and lifecycle containers can then be built or updated 294 using the above approach.

Figure 7:
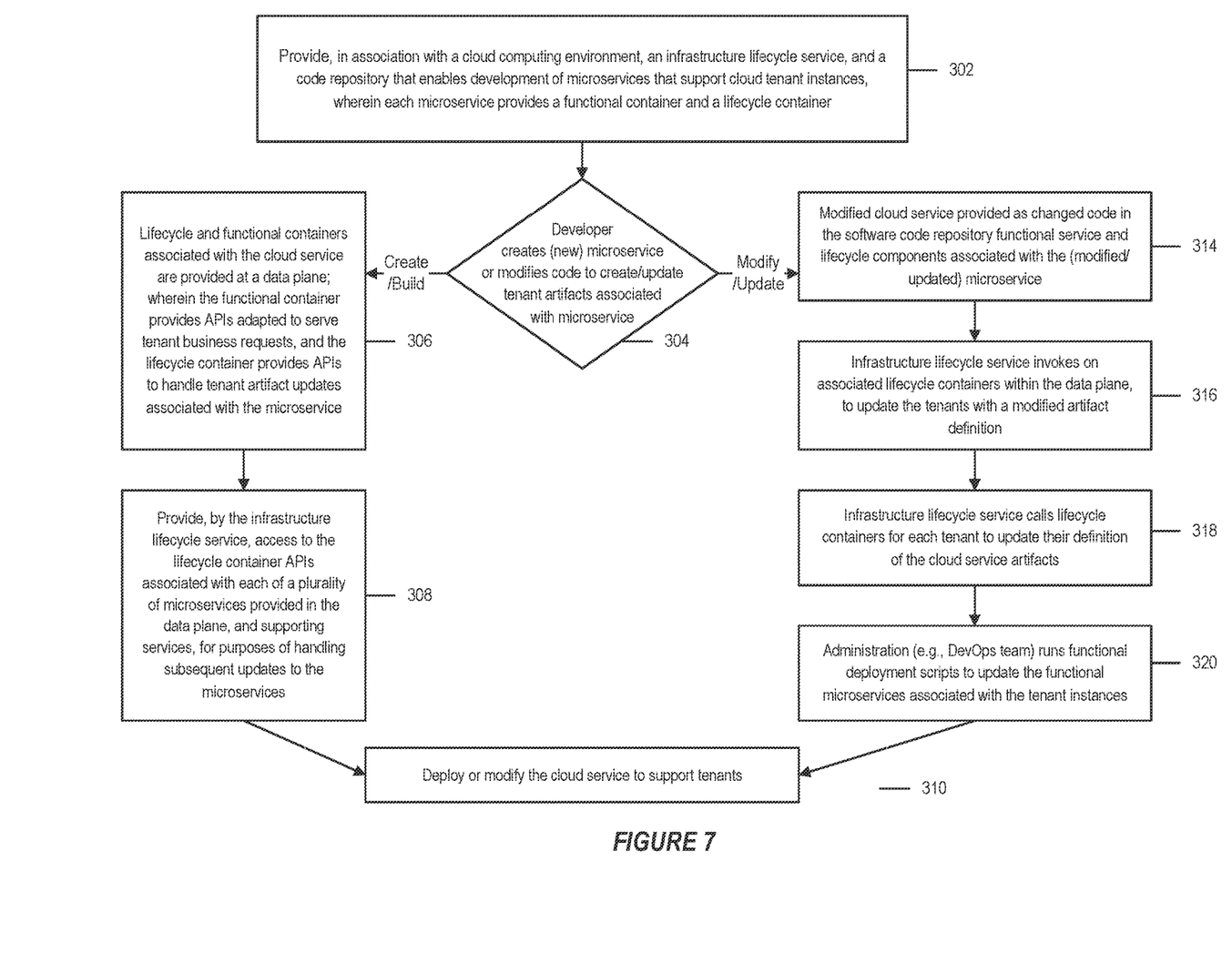
FIG. 7 illustrates a method for creating or updating tenant artifacts by a multi-tenant cloud service, in accordance with an embodiment.

FIG. 7 illustrates a method for creating or updating tenant artifacts by a multi-tenant cloud service, in accordance with an embodiment.

As illustrated in FIG. 7, in accordance with an embodiment, at step 302, the system provides, in association with a cloud computing environment, an infrastructure lifecycle service, and a code repository that enables development of microservices that support cloud tenant instances, wherein each microservice provides a functional container and a lifecycle container.

At step 304, a software developer either creates a (new) microservice or modifies code to create/update tenant artifacts associated with a microservice.

At step 306, during creation of a cloud service, lifecycle and functional containers associated with the cloud service are provided at a data plane. The functional container provides APIs adapted to serve tenant business requests, and the lifecycle container provides APIs to handle tenant artifact updates associated with the microservice.

At step 308, the system provides, by the infrastructure lifecycle service, access to the lifecycle container APIs associated with each of a plurality of microservices provided in the data plane, and supporting services, for purposes of handling subsequent updates to the microservices.

At step 310, the system can deploy or modify the cloud service to support tenants.

If instead, at step 304 the software developer is updating a cloud service, then at step 314, a modified cloud service can be provided as changed code in the software code repository functional service and lifecycle components associated with the (modified/updated) microservice.

At step 316, the infrastructure lifecycle service invokes on associated lifecycle containers within the data plane, to update the tenants with a modified artifact definition.

At step 318, the infrastructure lifecycle service calls lifecycle containers for each tenant to update their definition of the cloud service artifacts.

At step 320, an administration (e.g., DevOps team) runs functional deployment scripts to update the functional microservices associated with the tenant instances.

Figure 8:
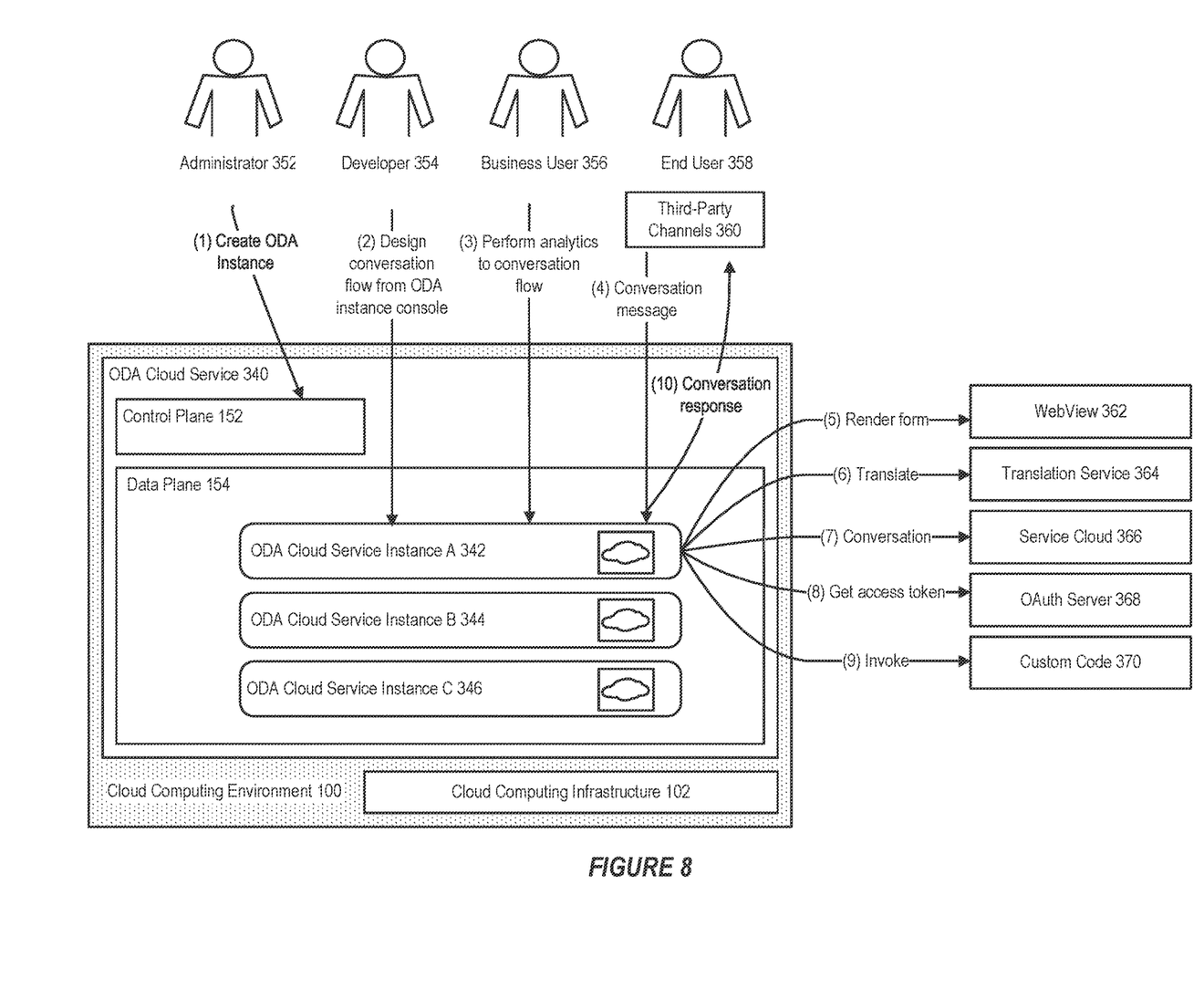
FIG. 8 illustrates an example use of the described approach with a multi-tenant ODA cloud service, in accordance with an embodiment.

FIG. 8 illustrates an example use of the described approach with a multi-tenant ODA cloud service, in accordance with an embodiment.

As illustrated in FIG. 8, which is provided by way of example for purposes of illustrating a use of the approach described herein, in accordance with an embodiment, an ODA cloud service 430 such as described above can be used to support interaction by administrator 352, software developer 354, business user 356, or end user 358 (via third-party channels 360) to interact with the cloud service, via one or more tenant instances A 342, B 343, C 346, built and updated as described above, including in this instance access to a WebView 362, translation service 364, service cloud 366, OAuth server 368, and/or custom code 370 components.

Implementation Example

In accordance with an embodiment, various details of a particular implementation or embodiment are provided below. The description is provided for the purposes of illustration and description. It is not intended to be exhaustive or to limit the scope of protection to the precise forms disclosed. Many modifications and variations will be apparent to the practitioner skilled in the art.

Microservices Code Repository

In accordance with an embodiment, the system can implement a lifecycle gRPC API defined by the infrastructure lifecycle service, including lifecycle and functional services in separate modules. For Spring Boot services, Spring profiles can be used, and a "lifecycle" profile as a configuration with which the lifecycle gRPC service will be active in "lifecycle" profile all other functional rest, gRPC API and Kafka listeners are inactive in "lifecycle" profile. With a "functional" profile, all functional rest, gRPC API and Kafka listeners will be active in "functional" profile. The lifecycle gRPC service will not be active in "functional" profile. The software developer can make any schema or other lifecycle operation related code change in their microservice and follow their existing merge process.

Microservice Packaging

In accordance with an embodiment, Spring Boot based microservices generate a Docker container. Non Spring Boot based microservice package two separate lifecycle and functional Docker containers.

Infrastructure Lifecycle Service

In accordance with an embodiment, the infrastructure lifecycle service can maintain the configurable list of microservices gRPC endpoints to be invoked for lifecycle operations. Implement update logic.

Infrastructure Lifecycle Service Packaging

In accordance with an embodiment, the infrastructure lifecycle service can utilize a Docker container containing only infrastructure lifecycle service code.

Helm Charts

In accordance with an embodiment, the system can maintain two separate helm chart repositories: an oda-process helm chart repository providing functional microservices pods (containers); and an oda-process-lifecycle helm chart repository providing infrastructure lifecycle service microservice pod and all other microservice lifecycle pods (containers). The oda-process-lifecycle helm would essentially refer to same microservice Docker containers but will bring it up in "lifecycle" profile. Microservice containers in "lifecycle" profile will be very light weight. It will have reduced heap and pod memory requests defined. The oda-process helm will bring up all process microservice containers with "functional" profile.

Build Pipeline

In accordance with an embodiment, the build pipeline can update Docker image version of functional microservices in Functional (oda-process) helm repositories. It will similarly also update Docker image version of infrastructure lifecycle service and functional microservices in lifecycle (oda-process-lifecycle) helm repository.

On-boarding a New Tenant

In accordance with an embodiment, the ODA control plane will invoke infrastructure lifecycle service end point for on-boarding the tenant. The infrastructure lifecycle service will pick an ATP instance from the ATP instance pool and create the schema user in it and update Instance Lookup service will tenant details. The infrastructure lifecycle service will then invoke each microservice lifecycle container to perform their respective tenant on-boarding operation (e.g., create its database artifacts in the schema).

Update

In accordance with an embodiment, during a first phase (1) oda-process-lifecycle Helm update. First the updated oda-process-lifecycle helm chart having updated Docker image versions for lifecycle container for each microservice and infrastructure lifecycle service would be applied. Once all of the lifecycle container pods with latest Docker container image are up and running (verified via script using retries until all pods are up), the infrastructure lifecycle service will be invoked for updating each tenant. The infrastructure lifecycle service would trigger update and invoke each lifecycle microservice container to perform an update for each service instance. As the updated microservices lifecycle Docker images will have the new schema changes with them if any, they will perform an update of their respective schema artifacts in the tenant schema. If there are any issue with updating a specific tenant, it can retried or investigation can be performed without affecting any live traffic from tenants to pods in process namespace.

In accordance with an embodiment, during a second phase (2) functional (oda-process) Helm update. Once all of the tenant instances are successfully updated, oda-process helm update would be performed to apply the new Docker image versions for functional containers.

Technical Advantages

In accordance with an embodiment, various technical advantages of the described approach include, for example:

Microservice code repository as a single source of truth for both functional and lifecycle containers. The microservice software developer need not go to a different repository to check in the software code for creating or updating tenant artifacts.

No additional packaging requirements on Spring Boot based microservices. They just need to support "Lifecycle" profile which helps to keep lifecycle container light weight.

Clean separation between infrastructure lifecycle service and individual microservice lifecycle containers. No need to update infrastructure lifecycle service for any microservice internal lifecycle logic change.

This approach will work with microservices in different platforms (e.g., Java, node js).

Minimal pipeline complexity.

Minimal complexity during production deployment of lifecycle containers followed by deployment of functional containers.

Tenant artifact creation/update operations (e.g., in database schema, object storage) are fully owned and managed from microservice code repository. The microservice software developer need not go to a different repository to check in the software code for creating or updating tenant artifacts.

Ensures that same version of lifecycle containers and functional containers of a microservice are always published together to production deployment helm chart repositories.

Tenant artifact creation/update with infrastructure lifecycle service and multiple loosely couple lifecycle containers responsible for each microservice.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for creating or updating tenant artifacts by a multi-tenant cloud service comprising:
    a computer including one or more processors that provides a cloud computing environment;
    an infrastructure lifecycle service that coordinates tenant artifact creation/update across multiple microservice lifecycle containers;
    a microservice code repository that enables development and packaging of lifecycle containers with software code responsible for tenant artifact creation/update, and functional containers with software code responsible for serving tenant business requests; and
    wherein a multi-tenant cloud service provided within the cloud computing environment provides a loosely-coupled approach to creating or updating tenant artifacts through the use of multiple independent microservices, each having their own requirements during the creation/update of a tenant's cloud service instance.

2. The system of claim 1, wherein microservices that support tenant artifact creation or update provide a lifecycle container, wherein the lifecycle container provides an application programming interface (API) that allows creation or upgrade of a service instance that uses that microservice.

3. The system of claim 2, wherein upon implementation of a service instance update, the system configures a contract or otherwise wires new/updated code to the lifecycle API implemented and associated with the container for that service.

4. The system of claim 1, wherein a container can run in different profiles and serve roles as a functional container, and another as a lifecycle container, wherein when the system brings the container up as a lifecycle, the container supports the lifecycle profile, and when the system brings the container up as a functional service, the container supports the function profile.

5. The system of claim 1, wherein the cloud service provides access by a plurality of tenants that access the cloud computing environment to access their respective service instance.

6. A method for creating or updating tenant artifacts by a multi-tenant cloud service comprising:
    providing, at a computer including one or more processors, a cloud computing environment;
    providing an infrastructure lifecycle service that coordinates tenant artifact creation/update across multiple microservice lifecycle containers;
    providing a microservice code repository that enables development and packaging of lifecycle containers with software code responsible for tenant artifact creation/update, and functional containers with software code responsible for serving tenant business requests; and
    wherein a multi-tenant cloud service provided within the cloud computing environment provides a loosely-coupled approach to creating or updating tenant artifacts through the use of multiple independent microservices, each having their own requirements during the creation/update of a tenant's cloud service instance.

7. The method of claim 6, wherein microservices that support tenant artifact creation or update provide a lifecycle container, wherein the lifecycle container provides an application programming interface (API) that allows creation of upgrade of a service instance that uses that microservice.

8. The method of claim 7, wherein upon implementation of the service instance update, configuring a contract or otherwise wires new/updated code to the lifecycle API implemented and associated with the container for that service.

9. The method of claim 6, wherein a container can run in different profiles and serve roles as a functional container, and another as a lifecycle container, wherein when the system brings the container up as a lifecycle, the container supports the lifecycle profile, and when the system brings the container up as a functional service, the container supports the function profile.

10. The method of claim 6, wherein the cloud service provides access by a plurality of tenants that access the cloud computing environment to access their respective service instance.

11. A non-transitory computer readable storage medium having instructions thereon, which when read and executed by a computer including one or more processors cause the computer to perform a method comprising:

providing, at a computer including one or more processors, a cloud computing environment;

providing an infrastructure lifecycle service that coordinates tenant artifact creation/update across multiple microservice lifecycle containers;

providing a microservice code repository that enables development and packaging of lifecycle containers with software code responsible for tenant artifact creation/update, and functional containers with software code responsible for serving tenant business requests; and wherein a multi-tenant cloud service provided within the cloud computing environment provides a loosely-coupled approach to creating or updating tenant artifacts through the use of multiple independent microservices, each having their own requirements during the creation/update of a tenant's cloud service instance.

12. The non-transitory computer readable medium of claim 11, wherein microservices that support tenant artifact creation or update provide a lifecycle container, wherein the lifecycle container provides an application programming interface (API) that allows creation of upgrade of a service instance that uses that microservice.

13. The non-transitory computer readable medium of claim 12, wherein upon implementation of the service instance update, configuring the system configures a contract or otherwise wires new/updated code to the lifecycle API implemented and associated with the container for that service.

14. The non-transitory computer readable medium of claim 11, wherein a container can run in different profiles and serve roles as a functional container, and another as a lifecycle container, wherein when the system brings the container up as a lifecycle, the container supports the lifecycle profile, and when the system brings the container up as a functional service, the container supports the function profile.

15. The non-transitory computer readable medium of claim 11, wherein the cloud service provides access by a plurality of tenants that access the cloud computing environment to access their respective service instance.

* * * * *